United States Patent [19]
Numakura et al.

[11] Patent Number: 4,780,769
[45] Date of Patent: Oct. 25, 1988

[54] RECORDING AND REPRODUCING APPARATUS FOR TIME COMPRESSED VIDEO SIGNALS WHEREIN SAID SIGNALS ARE EXPANDED AND CONVERTED INTO TWO SEPARATE CHANNELS BEFORE RECORDING

[75] Inventors: Toshihiko Numakura; Keiji Kanouta; Masashi Mizuta, all of Kanagawa; Masayoshi Ishimaru, Tokyo; Michio Nagai, Saitama, all of Japan

[73] Assignee: Sony Corporation, Tokyo, Japan

[21] Appl. No.: 826,026

[22] Filed: Feb. 4, 1986

[30] Foreign Application Priority Data

Feb. 5, 1985 [JP] Japan .................................. 60-20683
Feb. 14, 1985 [JP] Japan .................................. 60-27423

[51] Int. Cl.$^4$ ........................ H04N 9/80; H04N 9/88; H04N 9/89
[52] U.S. Cl. ..................................... 358/320; 358/324
[58] Field of Search .............. 358/310, 319, 320, 326, 358/323, 324, 325; 360/22, 23, 9.1

[56] References Cited

U.S. PATENT DOCUMENTS

| | | |
|---|---|---|
| 3,809,805 | 5/1974 | Kasprzak . |
| 4,084,181 | 4/1978 | Mita et al. . |
| 4,222,078 | 9/1980 | Bock ........................................... 360/23 |
| 4,520,401 | 5/1985 | Takahashi et al. .................. 358/310 |
| 4,541,020 | 9/1985 | Kimura ................................... 360/9.1 |
| 4,597,019 | 6/1986 | Nishimoto et al. .................. 358/320 |
| 4,614,980 | 9/1986 | Ninomiya et al. .................... 360/9.1 |
| 4,630,131 | 12/1986 | Ichinoi et al. ........................ 358/310 |
| 4,636,873 | 1/1987 | Eguchi ..................................... 360/8 |
| 4,688,081 | 8/1987 | Furuhata et al. ..................... 358/336 |
| 4,709,276 | 11/1987 | Yoshinaka ............................. 358/326 |
| 4,714,965 | 12/1987 | Yoshinaka et al. .................. 358/324 |

FOREIGN PATENT DOCUMENTS 0114694  11/1985  European Pat. Off. .
0168834  1/1986  European Pat. Off. .

OTHER PUBLICATIONS

High-Definition Television Systems-8078 Proceedings of the IEEE 73 (1985) Apr., No. 4, New York U.S.A.
A High-Definition Muse VCR with Analog Segment Recording Method 8087 IEEE Transactions on Consumer Electronics CE-32 (1986) May No. 2, New York, U.S.A.

Primary Examiner—Donald McElheny, Jr.
Attorney, Agent, or Firm—Hill, Van Santen, Steadman & Simpson

[57] ABSTRACT

A recording and reproducing apparatus wherein the video signal is time base expanded and separated into two channels before being recorded with a two headed recorder on two separate channels of a magnetic medium and wherein during reproduction the two channels from the magnetic medium are supplied to a time base corrector which supplies an output to a channel mixing and time base compressor which converts the two channels into a single output signal. A burst generator inserts burst signals into the two channels before they are recorded.

4 Claims, 12 Drawing Sheets

① 1st Field
② 2nd Field
③ 3rd Field
④ 4th Field

RECORDING AND REPRODUCING APPARATUS FOR TIME COMPRESSED VIDEO SIGNALS WHEREIN SAID SIGNALS ARE EXPANDED AND CONVERTED INTO TWO SEPARATE CHANNELS BEFORE RECORDING

BACKGROUND OF THE INVENTION

1. Field of the Invention

The invention relates in general to a recording system for video signals which are transmitted through a transmission line which has limited bandwidth.

2. Description of the Prior Art

Figure 1:
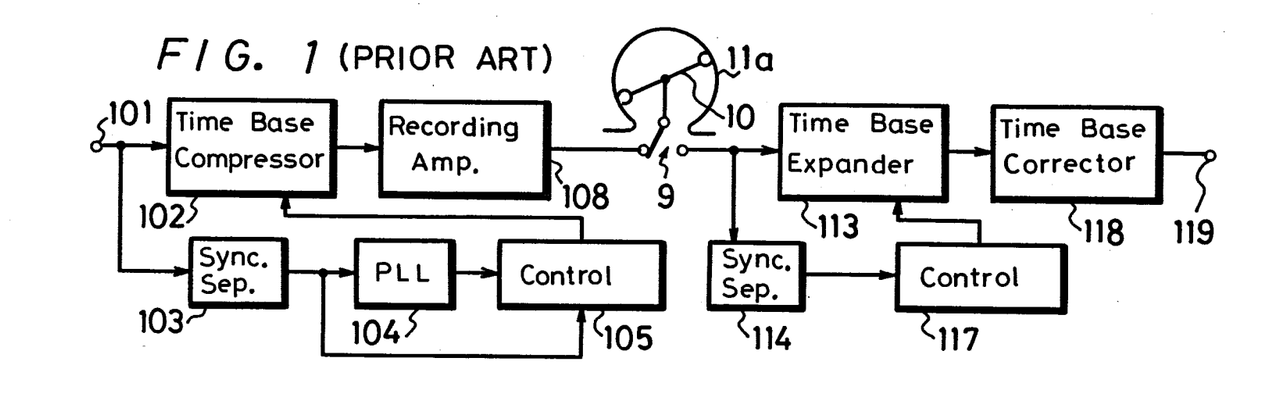
FIG. 1 illustrates a prior art system.

FIG. 1 illustrates a prior art system wherein an input terminal 101 receives an input signal which is connected to a time base compressor 2 which supplies an output to a recording amplifier 108 which supplies a signal to record/playback switch 9 that is connected to a rotary head 10 of a recorder to record the signal on a tape 11a. During reproduction, a signal is reproduced from the tape 11 by the rotary head 10 and is supplied through switch 9 which is placed in the reproduction position to supply the signal shown in FIG. 18D to a time base expander 113 which supplies an output through TB1 circuit 118 to an output terminal 119. A sync amp 103, a PLL 104 and control 105 are connected between input terminal and time base compressor 102. A sync separator 114 and control 117 are connected between the switch 9 and time base expander 113. The prior art circuit is subject to jitter.

When video signals having wide band are recorded and reproduced by using an existing video tape recording mechanism if the video signal is supplied to the video tape recorder in its original form, the carrier of, for example, FM recording will be increased which deteriorates the C/N ratio and the S/N ratio.

If the rotation of the rotary head is made to be twice its normal speed so as to increase the relative speed between the head and the tape, a video signal of wide band can be recorded. For this case, since the heads are switched at, for example, the center of the vertical direction of the picture screen, if the characteristics of the head are unbalanced the quality of the picture will be changed in the upper and lower positions of the picture screen so that the picture is substantially degraded.

In the prior art, when the video signal having wide band is recorded and reproduced by the above-described methods, there occurs a problem that a good picture cannot be obtained.

Figures 18A, 18B:
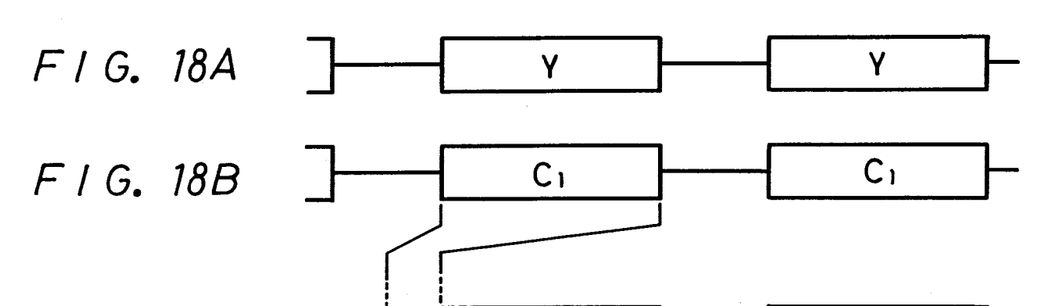
FIGS. 18A, 18B, 18C and 18D are diagrams for explaining the prior art apparatus.
Figures 18C, 18D:
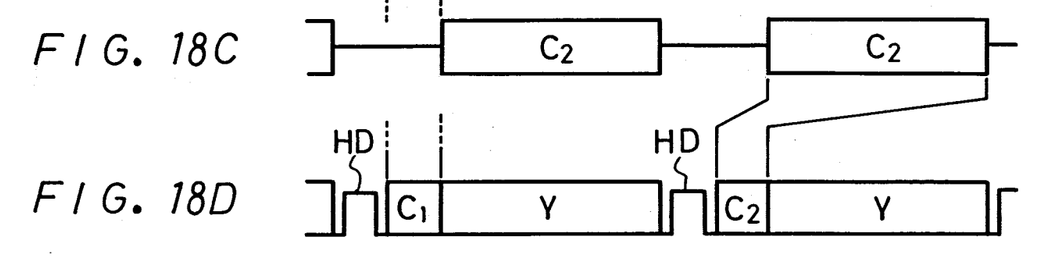

When there is a luminance signal Y illustrated, for example, in FIG. 18A and chrominance signals $C_1$ and $C_2$ of two systems as illustrated in FIGS. 18B and 18C, it is known as shown in FIG. 1 that the chrominance $C_1$ and $C_2$ are compressed in time-base during every horizontal period in a line sequential manner and inserted into the horizontal blanking period of the luminance signal Y and then transmitted as a single composite signal illustrated in FIG. 18D.

When the band width of the signal transmission line is limited so as to effectively utilize the band width for the picture signal (the luminance signal Y and the chrominance signal C), a synchronizing signal (horizontal synchronizing HD) is inserted into the signal with the same polarity as the picture signal as is illustrated in FIG. 18D. The synchronizing signal cannot be detected and separated by level detection methods unlike, for example, an NTSC signal in the prior art but uses a frame synchronizing signal of a particular pattern which is inserted during every frame of a video signal and this pattern is detected so that on the basis of the frame synchronizing signal which is detected the horizontal synchronizing signal HD is detected at the timing of the horizontal period.

For this reason, when the above-described composite signal (TCI signal) with the synchronizing signal inserted therein is recorded and reproduced by video tape recorder, if a time-base fluctuation such as jitter occurs in the reproduced signal it becomes difficult to detect the horizontal synchronizing signal HD. Thus, it becomes impossible to time-base expand the chrominance signal on the basis of the horizontal synchronizing signal HD.

When a time-base correction (TBC) is intended to be accomplished for the reproduced signals, only the frame synchronizing signal can be used as a reference signal so that a time-base correction becomes very difficult to be accomplished and perfect correction becomes impossible.

Also, the detection and separation of the synchronizing signal requires the above-described procedures and a substantial amount of time is required until the synchronizing signal is detected. Particularly, when a so-called servo-control of the video tape recorder is carried out on the basis of the synchronizing signal upon playback a large amount of lock-in time is required.

SUMMARY OF THE INVENTION

The present invention relates to a recording system for a video signal in which a video signal is processed relative to its time base at every horizontal period and is alternately divided into two channels at every horizontal period and then recorded whereby a video signal having wide band can be recorded by a video tape recorder having narrow band.

The present invention provides a recording system wherein at the recorder and input video signal is supplied to an input terminal and is time-base expanded or compressed at every horizontal period and alternately separated to first and second channels at said unit of one horizontal line and the recording is carried out at every first and second channels and at the reproducing side the reproduced signals of said first and second channels are time-base processed and channel composed in a procedure which is opposite to those used at the recorder so as to obtain an output video signal which is the same as the original input signal.

According to the apparatus of the invention, since the video signal is processed for time base at every horizontal period and alternately separated to two channels at every horizontal period and then recorded, the video signal having wide band can be recorded and reproduced by the video tape recorder having narrow band and the quality of the picture will not be degradated or differ between the upper and lower portions of the picture screen.

The present invention also relates to apparatus for recording and reproducing a video signal that is transmitted through a transmission line which has a limited bandwidth. Upon recording a new horizontal synchronizing signal and a burst signal which can be easily detected are added into the signal and during reproduction the video signal is time-base corrected by the horizontal synchronizing signal and the burst signal so as to obtain a good video signal which has a stable time-base.

The present invention obtains a composite signal which is recorded and reproduced with a video tape recorder that provides satisfactory reproduced signal which will not have jitter.

The present invention provides a recording and reproducing apparatus for recording and reproducing video signals wherein such video signal is provided with a horizontal synchronizing signal HD having a polarity which is the same as the picture signal during a horizontal period of said picture signal is recorded and reproduced and during recording a second horizontal synchronizing signal RH which has an opposite polarity to the picture signal and a burst signal RB are added to the signal and recorded and wherein during reproduction the second horizontal synchronizing signal is extracted by level detection and the burst signal is extracted by the second horizontal synchronizing signal and time-base errors of said picture signal and horizontal synchronizing signal are removed by using said extracted burst signal so as to reproduce an improved video signal.

According to the invention, during recording a second synchronizing signal and a burst signal which can be easily separated are added to the signal and during reproduction they are separated and then time-base errors are corrected so that a good video signal will be produced.

Other objects, features, and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 2:
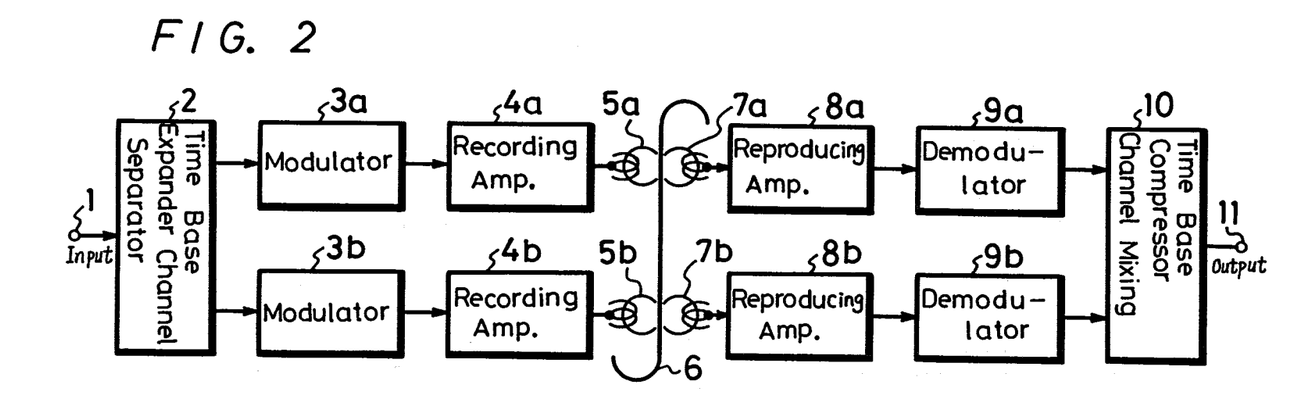
FIG. 2 is a block diagram illustrating an embodiment of the invention.

FIG. 2 is a block diagram illustrating the embodiment of the invention wherein an input terminal 1 receives an input signal which is connected to a time base expander channel separator 2 which receives the input signal and separates it into two separate channels and supplies it to a pair of modulators 3a and 3b. Recording amplifiers 4a and 4b receive the output of the modulators 3a and 3b and respectively supply outputs to the recording heads 5a and 5b which record a signal on two separate channels on the tape 6. A pair of playback heads 7a and 7b, respectively, scan the channels recorded by the recording heads 5a and 5b and supply outputs to playback amplifiers 8a and 8b, respectively. Demodulators 9a and 9b receive the output of the playback amplifiers 8a and 8b and supply inputs to a time phase compression/channel mixing circuit 10 which supplies an output to the output terminal 11.

Figure 3A:
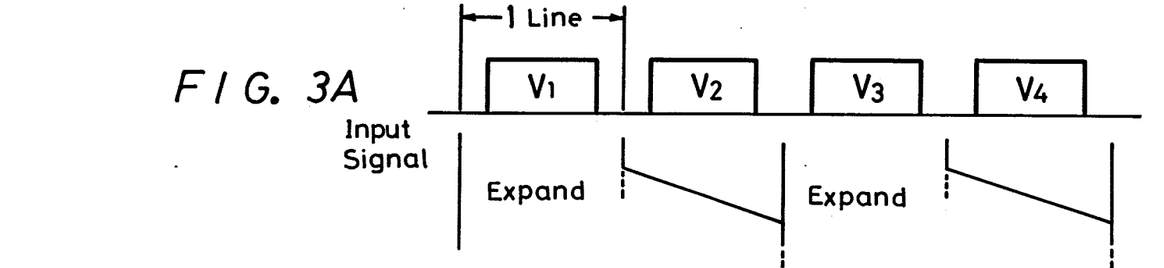
FIGS. 3A, 3B and 3C are waveform diagrams for explaining the invention.
Figure 3B:
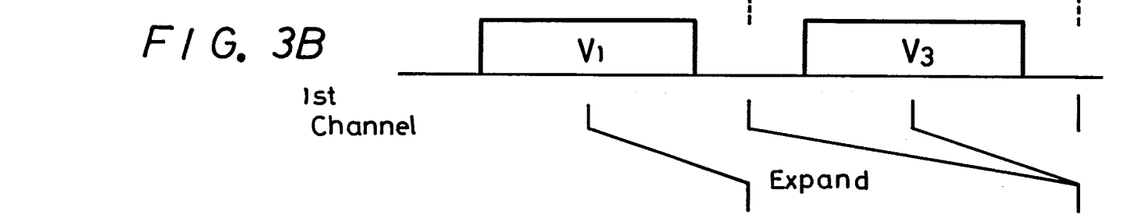
Figure 3C:
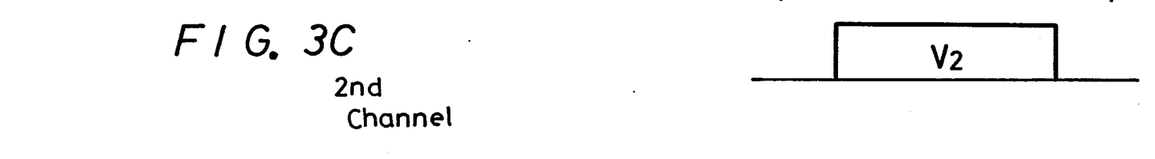

In FIG. 2, at the recorder the video signal having, for example 1125 horizontal scanning lines is supplied to the input terminal 1. Such video signal is supplied to a time-base expansion/channel separation circuit 2 where it is separated to video signals of two separate channels to obtain video signals $V_1$, $V_2$, . . . for each horizontal period and the waveforms are shown in FIG. 3A and are time-base expanded by a factor of 2 as illustrated in FIGS. 3B and 3C. At the reproducing side, the two channel video signals are independently reproduced from the recording tracks of the tape 6 by the playback heads 7a and 7b and amplified by the playback amplifiers 8a and 8b and supplied to the demodulators 9a and 9b, respectively. The signals from the demodulators 9a and 9b are supplied to a time-base compression/channel mixing circuit 10 where they are processed for time-base and channel mixed in a procedure which is opposite to the procedures used at the recording side and then supplied to the output terminal 11.

Thus, in the present invention, since the band width of the video signal can be made narrow by time-base expanding the video signal at the recording side and the recording wave length can be increased, the C/N ratio and S/N ratio can be improved by lowering the carrier of, for example, the FM recording.

Further, since the input video signal is alternately separated into two channels at every horizontal period, even if the scattering of characteristics occur between the channels the difference between picture quality occurs at every horizontal scanning line and is prevented from becoming a difference between large picture screens. Thus, such differences can be prevented from being conspicuous and offensive to the viewer.

As described above, the video signal is recorded and reproduced. According to the above-described apparatus, since the video signal is processed on a time-based manner at the unit of every horizontal period and is alternately separated to two channels at a time-base of every horizontal period and then recorded, the video signal having wide band can be recorded and reproduced by the video tape recorder which has narrow band and also it is possible to prevent the quality of the picture from being changed between the upper and lower portions of the picture screen.

Figure 8:
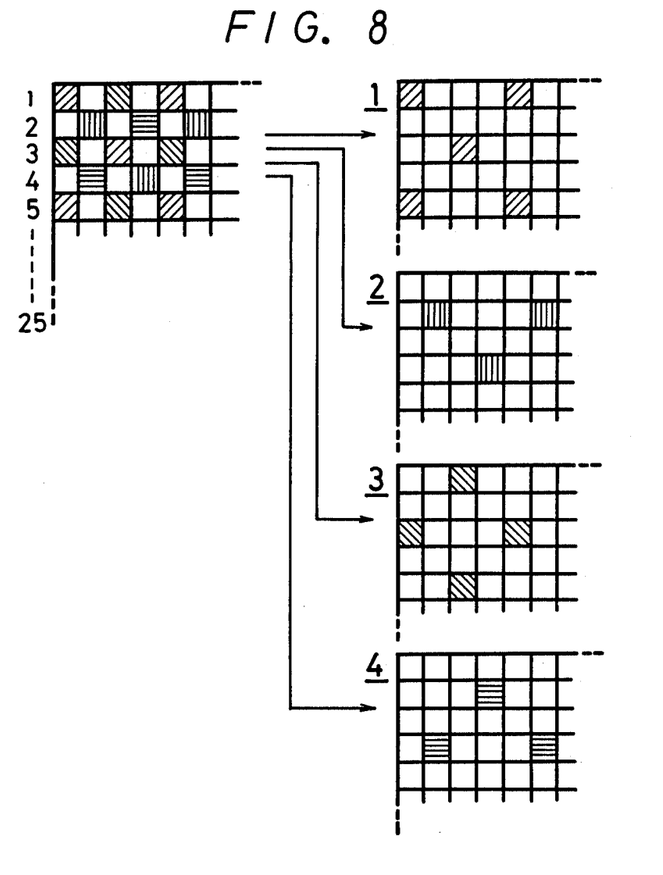
FIG. 8 illustrates the interlace pattern.
Figure 9:
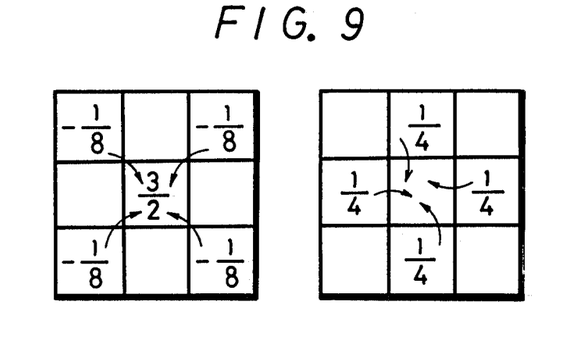
FIG. 9 illustrates the interpolation method of the invention.
Figure 10:
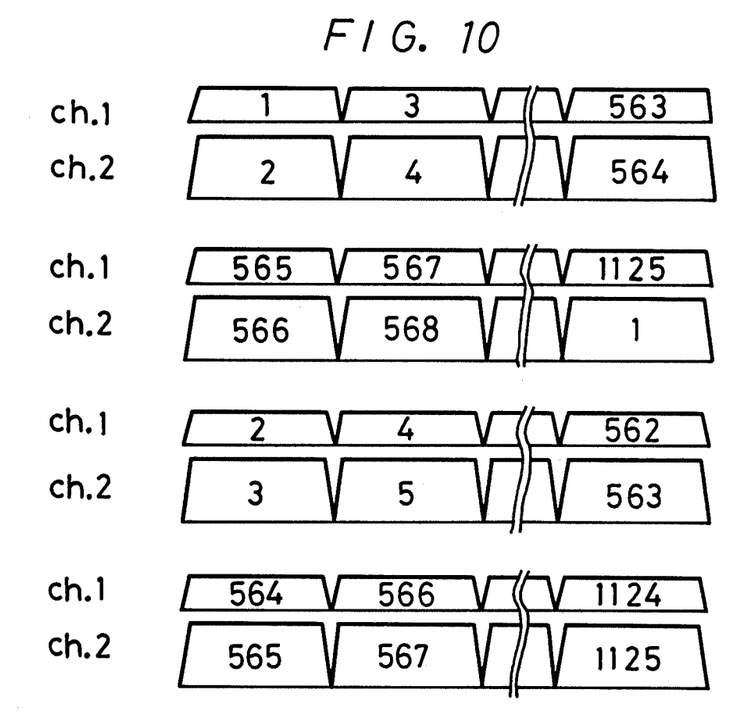
FIG. 10 illustrates graphs of the first and second channels.

In the above-described video signal having, for example, 1125 horizontal scanning lines, it is proposed as shown in FIG. 8 that the video signal be subsampled which subsampling is completed in every four fields so as to compress the signal band. When such signal is restored, the video signal is formed from the signal of four fields which are stored in a memory by carrying out the data conversion and the interpolation at the sampling point as illustrated in FIG. 9.

Figure 11:
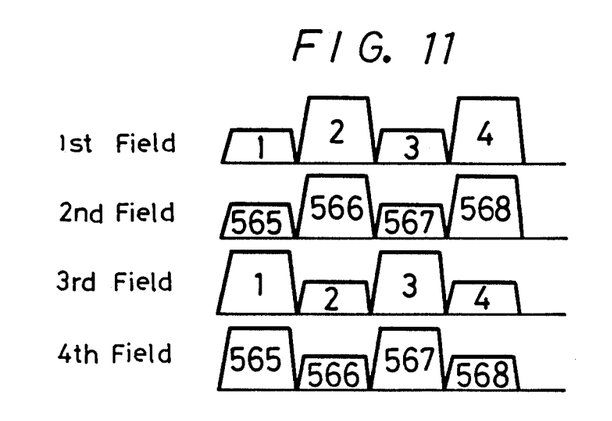
FIG. 11 illustrates graphs of the first, second, third and fourth fields.
Figure 12:
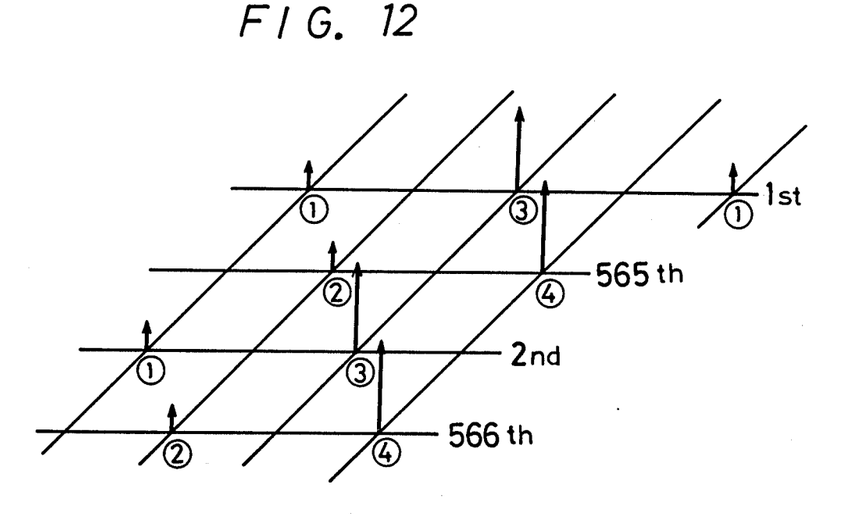
FIG. 12 illustrates signals in the various fields.
Figure 13:
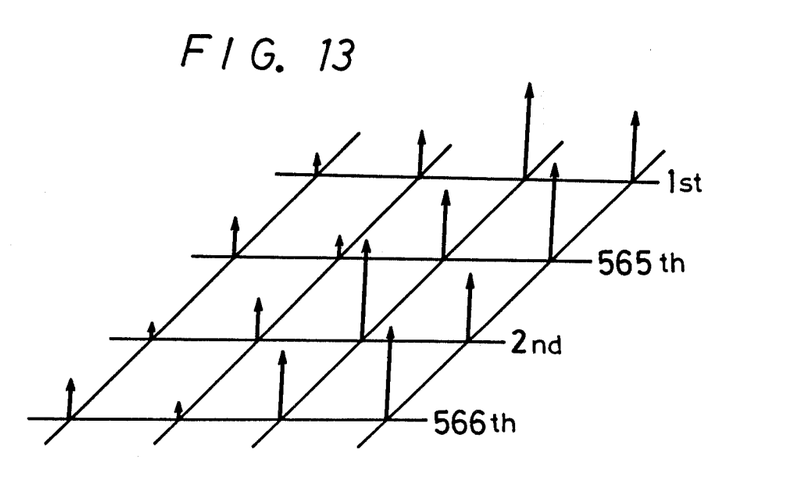
FIG. 13 illustrates signals according to the invention.

When it is considered that the signal with the band thus compressed whereas however this band is still wider than the band of the video tape recorder is recorded by the above-mentioned recording system, since in the above-recording system, the number of the horizontal periods of one frame is odd, a relationship between the channel separated at every horizontal period and the sequential order of the horizontal period is completed at the unit of two frames. Whereas if the scattering of characteristics occurs between the channels and the output level of, for example, the first channels is lowered, the output signal from the video tape recorder at that time becomes illustrated in FIG. 11 at every field. When such signals are stored in the memory, the distribution of signals becomes as shown in FIG. 12. If the signals are restored by the above-mentioned data conversion and interpolation, the distribution of such signals will be as illustrated in FIG. 13. As is apparent from FIG. 13, the level of the signals fluctuate at every two lines in the vertical direction and this level fluctuation becomes a so-called vertical striped pattern and is very offensive to the eye.

Figure 4:
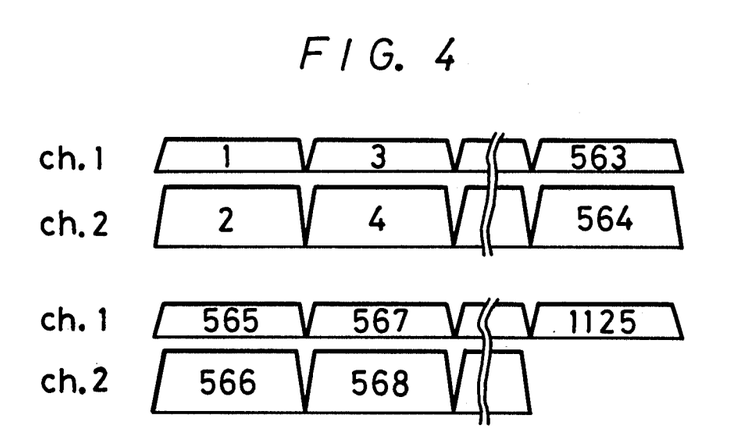
FIG. 4 illustrates graphs of the first and second channels.

Therefore, when the signal which has been band compressed by the described recording system as shown in FIG. 4, the channel separation is adjusted such that the relationship between the channel and the horizontal period is completed in one frame.

Figure 5:
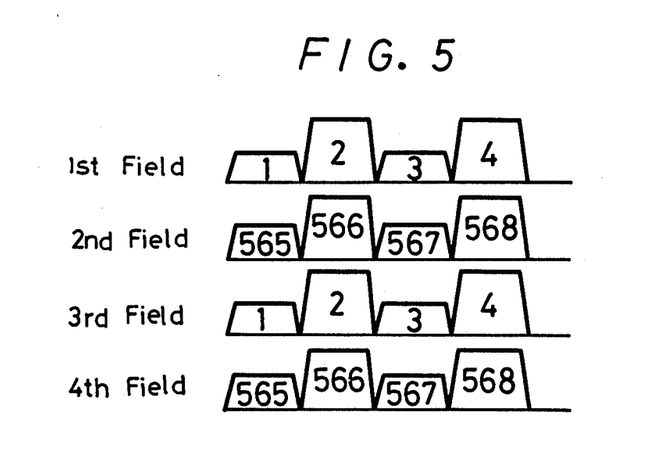
FIG. 5 illustrates graphs of the first, second, third and fourth fields.
Figure 6:
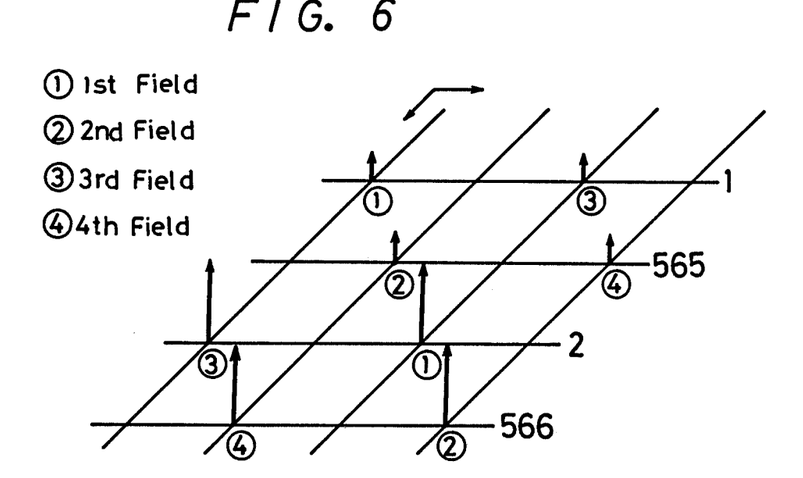
FIG. 6 illustrates first, second, third and fourth fields.
Figure 7:
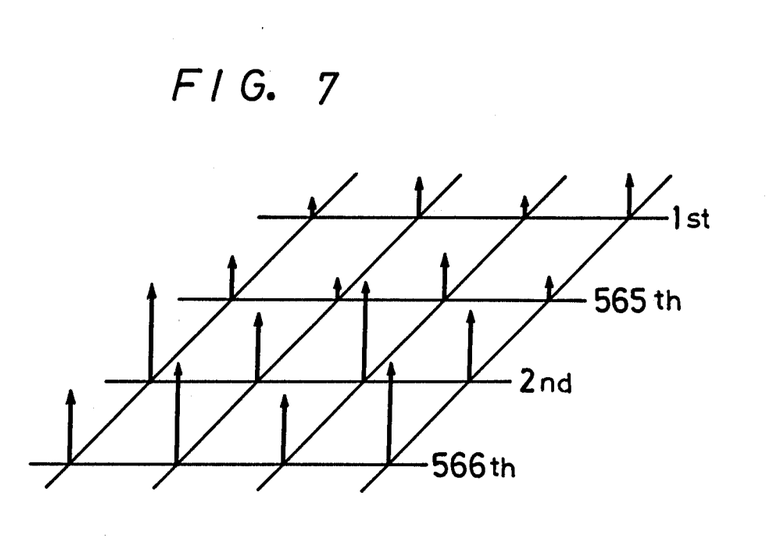
FIG. 7 illustrates graphs illustrating different fields.

According to this system, the output signals from the video tape recorder become as shown in FIG. 5 at every field and when the signal are stored in the memory, the distribution of the signals becomes as shown in FIG. 6. If the signals are restored to the original signal by the above-mentioned data conversion interpolation, the distribution will be as shown in FIG. 7. Accordingly, as made clear from FIG. 7, the line crawl will be removed. In this case, although a horizontal striped pattern is produced, the horizontal stripe is not so offensive to the human eye as is the line crawl.

As described according to this embodiment, it is possible to achieve the same action and effect in the second embodiment as in the first embodiment.

Also, when the above-mentioned signal which has been band compressed is recorded and reproduced and then restored the offensive vertical striped pattern will be prevented from being produced.

It is seen that the present invention provides an improved recording system and illustrates how to record for time compressed integration wherein during the first line one color signal is transmitted and during another line another color is transmitted. Signals are transmitted by FM period.

Figure 14:
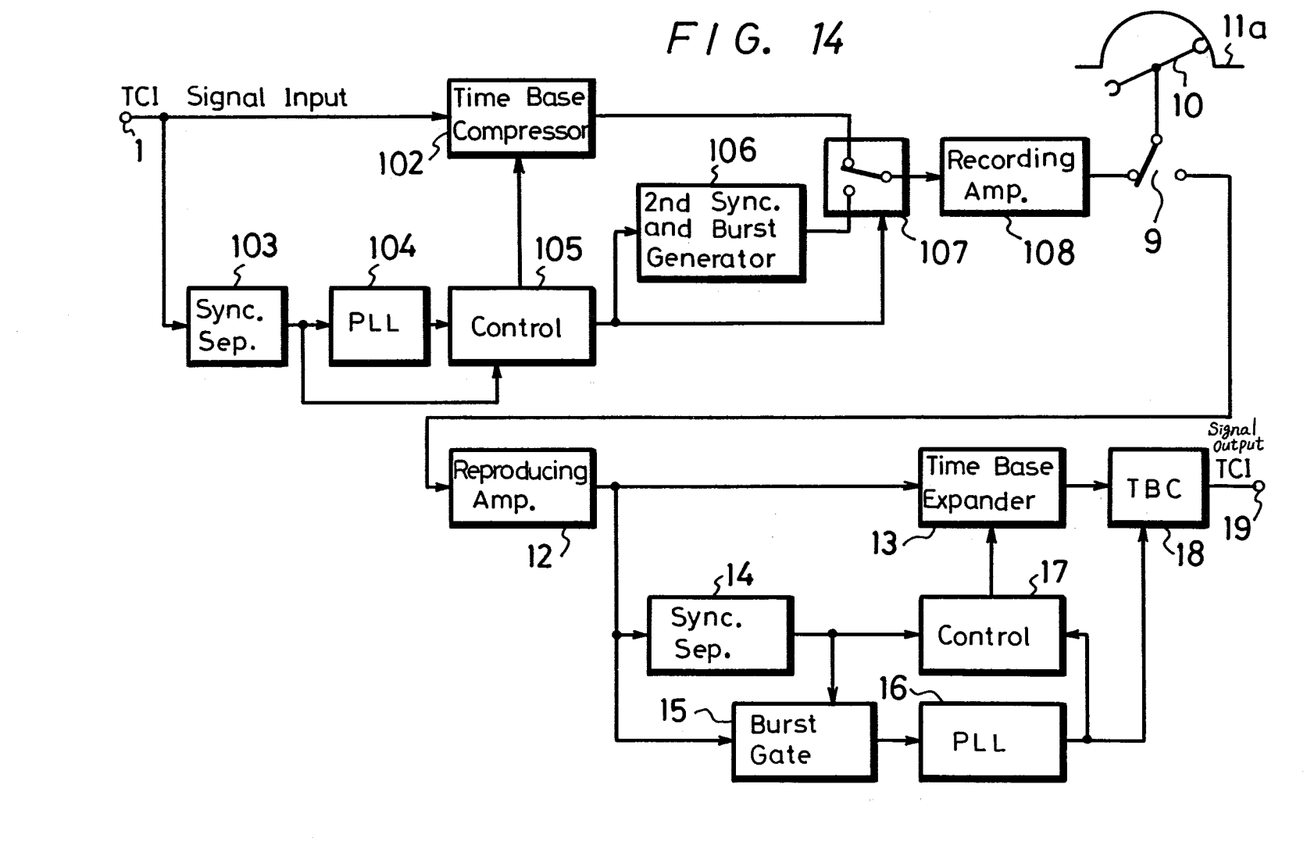
FIG. 14 is a block diagram for explaining the invention.
Figure 15A:
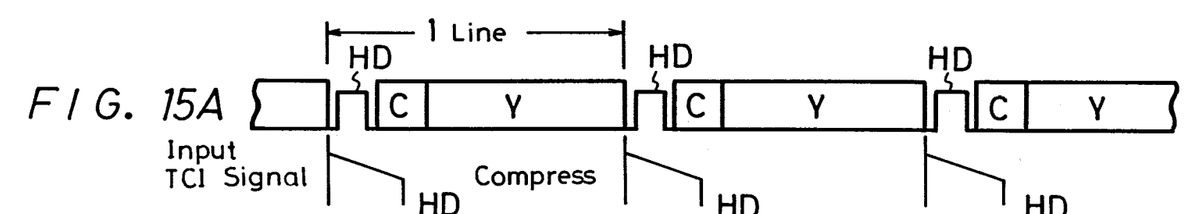
FIGS. 15A, B and C illustrate wave forms.
Figures 15B, 15C:
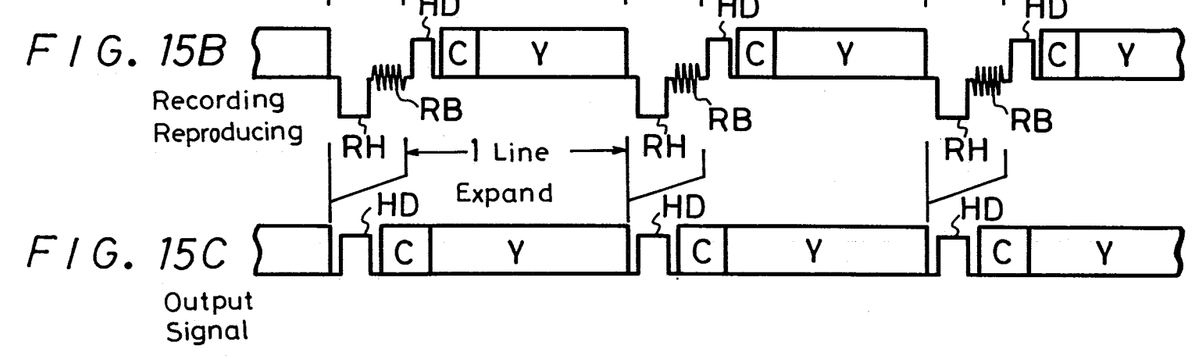

FIG. 14 is a block diagram showing the structure of a recording and reproducing apparatus. During recording mode, a TCI signal which has the waveform illustrated in FIG. 15A is supplied to an input terminal 1 which supplies it to a time-base compressor circuit 102 and also to a sync separator circuit 103 in which a synchronizing signal is separated according to the previously mentioned procedures. The synchronizing signal thus separated is supplied to a PLL 104 (phase lock loop) in which a clock signal having a predetermined frequency is generated. This clock signal and the synchronizing signal are supplied to a control circuit 105 in which a timing signal is generated at every horizontal period containing the horizontal synchronizing signal HD, the chrominance signal C and the luminance signal Y. This timing signal is supplied to the time-base compressor circuit 102 in which the signal is compressed during one horizontal period with a predetermined ratio as illustrated in waveform of FIG. 15B. Also, the timing signal from the control circuit 105 is supplied to a generator circuit 106 in which a second horizontal synchronizing signal RH having a polarity which is opposite to the picture signal (the chrominance signal C and the luminance signal Y) is generated as well as a burst signal RB having a predetermined frequency and phase and are inserted into the signal into the space provided by the compression of the one horizontal period. The signal thus generated and the signal from the compressor circuit 102 are switched in a switch 107 by the timing signal from the control circuit 105 to generate a recording signal with a waveform which is illustrated in FIG. 15B.

The signal is supplied through a recording circuit 108 through a record/playback changeover switching circuit 9 to the rotary head 10 of a recorder wherein the signal is recorded on a tape 11a.

During reproduction a signal is reproduced from the tape by the rotary head 10 and is supplied through the switch 9 which is moved to the reproduction position to supply the signal to the reproducing circuit 12. The reproduced signal will be equivalent to the signal shown in waveform of FIG. 15B, however, it contains a jitter component. This signal is supplied from the reproducing circuit 12 to a time-base expansion circuit 13 and also to a sync separator circuit 14 for separating the second horizontal synchronizing signal RH and also to a burst gate circuit 15 for separating the burst signal RB. The synchronizing signal separated by the sync separator 14 is fed to the burst gate 15 which separates the burst signal RB. The burst signal RB which has been extracted is supplied to a PLL 16 (phase lock loop) in which a clock signal of a predetermined frequency containing the previously mentioned jitter component is generated. The clock signal and the synchronizing signal are fed to a control circuit 17 in which a timing signal is generated at every horizontal period with the time-base being compressed. This timing signal is supplied to the time-base expansion circuit 13 in which during one horizontal period the signal is expanded so as to become identical to the original length illustrated in FIG. 15C. The signal of each horizontal period time-base which has been expanded is made continuous and is fed to a time-base corrector circuit 18 (DPC) and the clock signal from the PLL 16 is supplied to the TBC circuit 18 which generates the TCI signal (time compressed integrator) in which the jitter component has been removed and which has the waveform illustrated in FIG. 15C. This signal is supplied to the output terminal 19.

Thus, in the present invention, since during recording, the second horizontal synchronizing signal having a polarity which is opposite to the picture signal and a burst signal are added to the video signal when such signal is reproduced, the synchronizing signal can be easily separated and in a very short time by level detection or the like in the synchronizing separating circuit 14. Also, since the burst signal occurs in close proximity to the synchronizing signal, the burst signal can be easily and accurately extracted in the burst gate circuit 15 by delaying the synchronizing signal. Also, in the PLL circuit 16 the clock signal can easily and satisfactorily be generated by using the burst signal.

In this manner, the TCI signal is recorded and reproduced. According to the apparatus described above since during recording the second synchronizing signal and the burst signal which are easily separated are added to the video signal and during reproduction they are separated and the time-base correction and so on are accomplished, it is possible to reproduce satisfactory video signal very easily.

In the described apparatus, a second synchronizing signal and the burst signal are added to the video signal such that they are inserted into the time space which is provided by the time-base compression of the picture signal although they may be added to the video signal by other methods. For example, a part of the luminance signal could be removed into which the signals RH and RB are inserted.

In one embodiment, since the signal is time-base compressed during recording, the frequency bandwidth of the signal will be widened which requires a video tape recorder which has a wider band width than the transmission line. In another embodiment which is described below, the recording and reproduction are accomplished with a video tape recorder having a narrow bandwidth. Specifically, in the other embodiment the recording and reproduction apparatus is applied through a system in which the signal is distributed into two channels during every one horizontal period then recorded and reproduced thus making the band width of the video tape recorder very narrow.

Figure 16:
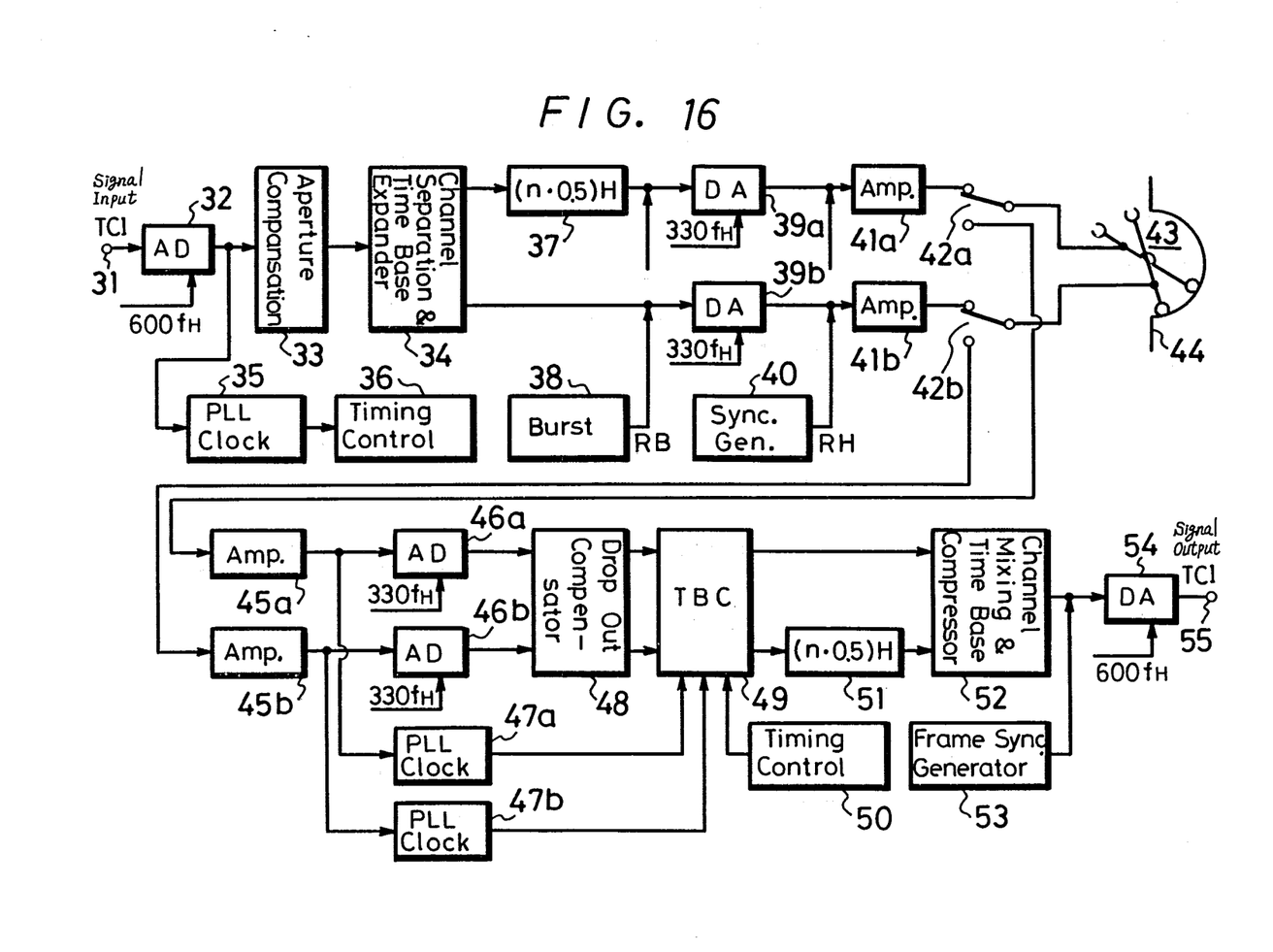
FIG. 16 is a block diagram illustrating the invention.
Figure 17A:
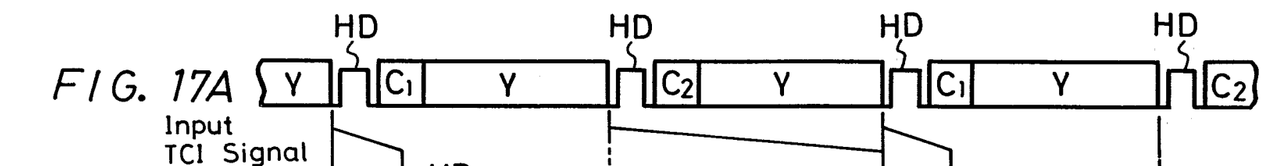
FIGS. 17A, 17B, 17C and 17D are diagrams used for explaining the invention.
Figure 17B:
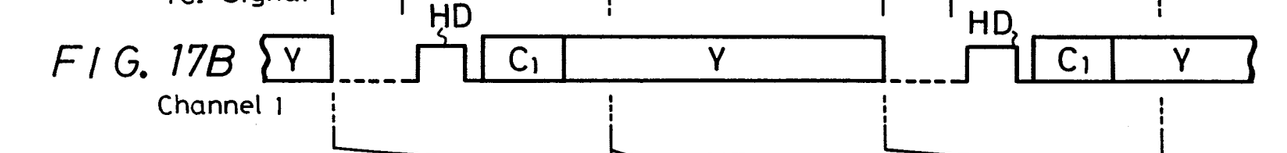
Figure 17C:
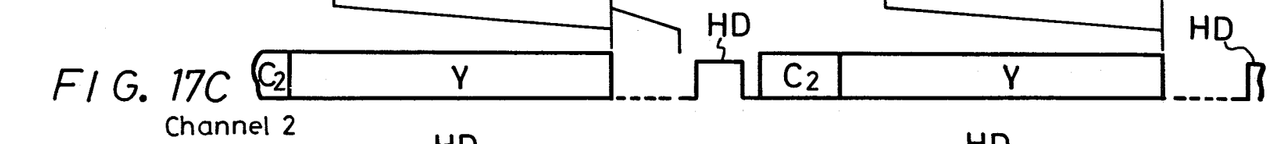

FIG. 16 illustrates another embodiment and during recording a TCI signal is supplied to the input terminal 31 and is then supplied to an A/D converter circuit 32 in which it is digitized at a sampling frequency of, for example, $600f_H$ ($f_H$ is the horizontal frequency). The digitized signal is supplied through an aperture compensation circuit 33 to a channel separation/time-base expansion circuit 34. The digitized signal is also supplied to a PLL clock generator circuit 35. The clock signal from the clock generator 35 is supplied to a timing control circuit 36. Thus, in the time-base expansion circuit 34 a signal having a waveform such as illustrated in FIG. 17A is expanded for example (20/11) times during every horizontal period and then there are generated signals of two channels that have a time spacing between their respective horizontal periods as illustrated in FIGS. 17B and 17C. At the output of the channel separation and time-base expander, there is provided a delay circuit 37 having a delay time equal to the timing distance between the two heads plus 0.5H (H is the horizontal period). The delay circuit 37 is in the channel of the first recording head as illustrated. Then adjacent horizontal periods are recroded on the tape at adjacent track portions.

A digital burst signal RB is generated by a generator circuit 38 and is inserted into each of the two signals. The burst signals are inserted, respectively, into D/A converter circuits 39a and 39b in which the signals are converted to analog signals at a sampling frequency of $330f_H$.

A second horizontal synchronizing signal RH having a polarity which is opposite to the picture signal and which is derived from a synchronizing generator circuit 40 is inserted into the analog signals as illustrated.

Figure 17D:
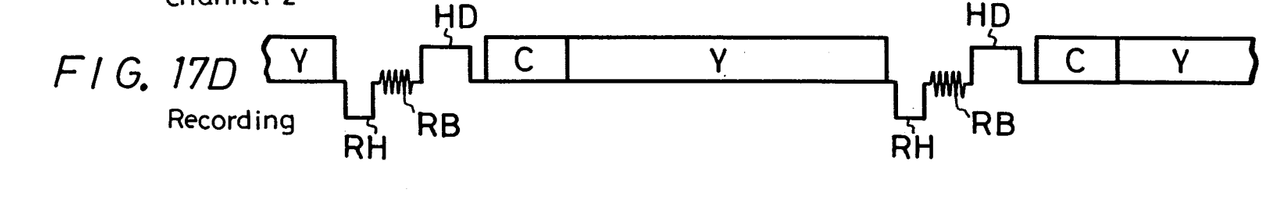

In this manner, in the respective channels, there is formed a signal which is added to the second horizontal synchronizing signal RH and the burst signal RB and the waveform of this signal is illustrated in FIG. 17D. Since the burst signal RB is inserted into the signal before it is D/A converted, the phase information will be accurate and since the horizontal synchronizing signal RH is inserted into the signal after it is D/A converted, it is possible to effectively utilize the dynamic range of the D/A conversion.

These signals are supplied through recording circuits 41a and 41b to a rotary recording head 43 which has two pairs, in other words, four heads so that the recording is carried out such that each of the channels is formed into a track on a tape 44 and the video signals of one field is formed by two tracks.

During reproduction, the signals reproduced from the tape 44 by the rotary head 44 are supplied through the switches 42a and 42b to the reproducing circuits 45a and 45b. These signals are equivalent to the signal shown in the waveform diagram of FIG. 17D but contain jitter component. These signals are respectively supplied to A/D converter circuits 46a and 46b and are digitized at the sampling frequency of $330f_H$. The signals from the reproducing circuits 45a and 45b are also supplied to PLL clock generator circuits 47a and 47b in which clock signals having predetermined frequencies and containing the jitter components are respectively generated.

Also, the signals from the A/D converter circuits 46a and 46b are supplied through a dropout compensating circuit 48 to a time-base correction circuit (TBC) 49 and the clock signals from the generator circuits 47a and 47b are supplied to the time-base corrector circuit 49. Also, a signal from a timing-control circuit 50 is supplied to the time-base corrector circuit 49 and time-base correction of the reproduced signal is accomplished.

Of the signals of which the time-base is corrected, in the channel at the side of the signal reproduced by the succeeding one of the two heads, there is provided a delay circuit 51 so as to correct the delay caused by the delay circuit 37 used in the recording mode. The corrected signals are supplied to a channel mixing/time-base compressor circuit 52 in which the signal is compressed for time-base and mixed with a reverse operation to that of the expansion circuit 34 used in the recording mode.

A digital frame synchronizing signal from a generator cricuit 53 is inserted into the signal and then fed to a D/A converter circuit 54 in which it is converted to an analog signal at a sampling frequency of $600f_H$ to generate a TCI signal in which the jitter component has been removed. This signal is delivered to the output terminal 55.

Thus, this apparatus achieves the same results and effect as that of the other emobidment and in the present embodiment, the frequency band is made narrower by the expansion of the time-base during recording so that the recording and reproducing can be carried out using a video tape recorder having narrow band width.

According to the present invention, since during recording, the second synchronizing signal and the burst signal which are easily separated are added to the video signal and during reproducing they are separated and are corrected for time-base and similar effects a satisfactory video signal can be easily reproduced.

Although the invention has been described with respect to prefered embodiments, it is not to be so limited as changes and modifications can be made which are within the full intended scope of the invention as defined by the appended claims.

We claim as our invention:

1. A recording and reproducing apparatus for time compressed video signals comprising a channel separation and time base expander which receives an incoming digital video signal and converts it to first and second time expanded video signals, a burst signal generator supplying burst signals which are superimposed on said first and second time expanded video signals, first and second digital to analog converters, respectively receiving said first and second time expanded video signals and said burst signals and converting them to analog signals, a switching means connected to said first and second digital to analog converters, a video rotary head recorder-reproducer head connected to said switching means and receiving said first and second time expanded video signals from said switching means and recording them as separate channels on a magnetic medium, first and second analog to digital converters connected to said switching means to receive two reproduced signals from said video rotary head recorder-reproducer head, a time base corrector connected to recieve said two reproduced signals from said first and second analog to digital converters, first and second phase locked lock loop means receiving said two reproduced signals from said switching means and each supplying inputs to said time base corrector, a channel mixing and time base compressor receiving the outputs of said time base corrector and producing a single digital output signal, and a third digital to analog converter receiving an output from said channel mixing and time base compressor and converting it to an analog output signal.

2. A recording and reproducing apparatus according to claim 1 including a first time delay means having a time delay of (n. 0.5H) connected to receive and delay said first time expanded signal before supplying it to said first digital to analog converter where n is an integer and H is the horizontal scaning frequency.

3. A recording and reproducing apparatus according to claim 2 including a second time delay means having a time delay of (n. 0.5H) connected to receive and delay one of said outputs of said time base corrector before supplying it to said channel mixing and time base compressor.

4. A recording and reproducing apparatus according to claim 3 including a frame sync generator supplying an input to said third digital to analog converter.

* * * * *